(12) United States Patent
Reed

(10) Patent No.: US 7,534,047 B2
(45) Date of Patent: May 19, 2009

(54) JOURNAL BEARING BACKING RING

(75) Inventor: Martin Earl Reed, Chester, VA (US)

(73) Assignee: Amsted Rail Company, Inc, Granite City, IL (US)

( * ) Notice: Subject to any disclaimer, the term of this patent is extended or adjusted under 35 U.S.C. 154(b) by 808 days.

(21) Appl. No.: 11/121,469

(22) Filed: May 5, 2005

(65) Prior Publication Data

US 2006/0251352 A1 Nov. 9, 2006

(51) Int. Cl.
*F16C 33/78* (2006.01)
(52) U.S. Cl. .................. 384/477; 384/484; 384/551
(58) Field of Classification Search ............... 384/477, 384/482, 484, 486, 489, 548, 551, 569, 571, 384/584, 589
See application file for complete search history.

(56) References Cited

U.S. PATENT DOCUMENTS

| 4,915,536 | A | * | 4/1990 | Bear et al. | .................. 403/267 |
| 5,549,395 | A | * | 8/1996 | Sink | ........................... 384/477 |
| 7,219,938 | B2 | * | 5/2007 | Brister et al. | ................. 295/42 |

* cited by examiner

*Primary Examiner*—William C Joyce
(74) *Attorney, Agent, or Firm*—Edward J. Brosius

(57) ABSTRACT

A bearing assembly is provided having a roller bearing with an inner case fitted around the journal portion of an axle. An outer raceway combines with the inner raceway to receive roller elements. A backing ring is centered to the shaft fillet. An annular wear ring is positioned between the inner case and the backing ring. An annular sealant bead or a sealant ring form a seal between the shaft shoulder and the backing ring.

6 Claims, 2 Drawing Sheets

US 7,534,047 B2

JOURNAL BEARING BACKING RING

BACKGROUND OF THE INVENTION

This invention relates to sealed shaft journal bearings and more particularly to an improved bearing assembly, providing a seal or a sealant bead between a shoulder of the shaft and a backing ring.

Roller bearing assemblies incorporating two rows of tapered roller bearings preassembled into a self-contained, pre-lubricated package for assembly onto journals at the ends of axles or shafts are known. Such bearing assemblies are used as rail car bearings assembled onto journals at the ends of the car axles. Bearings of this type typically employ two rows of tapered roller bearings fitted one into each end of a common bearing cup with their respective bearing cones having an inner diameter dimensioned to provide an interference fit with the shaft journal and with a cylindrical sleeve or spacer positioned between the cones providing accurate spacing on the journal. Seals mounted within each end of the bearing cup provide sealing contact with wear rings bearing against the outer ends of the respective bearing cones at each end of the assembly.

In a typical rail car installation, the axle journal is machined with a fillet at the inboard end, and a backing ring having a surface complementary to the contour of the fillet and an abutment surface for engaging the inboard end of the inner wear ring accurately positions the bearing assembly on the journal. An end cap mounted on the end of the axle by bolts threaded into bores in the end of the axle engages the outboard wear ring and clamps the entire assembly on the end of the axle. The wear rings typically have an inner diameter dimensioned to provide an interference fit with the journal over at least a portion of their length so that the entire assembly is pressed as a unit onto the end of the journal shaft.

SUMMARY OF THE INVENTION

The bearing assembly is a roller bearing that includes an inner race or cone fitted around the journal portion of the axle or shaft. The inner case includes an outwardly directed raceway. An outer race or cup has an inwardly directed raceway. Roller elements are located between and contacting the inner and outer raceways.

A backing ring has a contoured surface complementary to and engaging the contoured surface of a fillet formed on the shaft. The fillet leads from the journal to the shoulder of the shaft. The contoured surfaces cooperate to fix the backing ring against axial movement along the shaft.

An annular wear ring is interposed between and engages the inner race and the backing ring. In one embodiment, the backing ring includes a shoulder that receives a corner of the wear ring.

An annular sealant bead is interposed between and engages the shaft shoulder and the backing ring.

In another embodiment, a first sealant ring is interposed between and engaging the shaft shoulder and the backing ring. A second sealant ring is interposed between and engaging the wear ring and the backing ring.

Such sealant bead on sealant rings form a seal to keep water, abrasives and other contaminants from entering the sealed bearing from along the shaft and between the shaft and backing ring.

DESCRIPTION OF THE PREFERRED EMBODIMENTS

Figure 1:
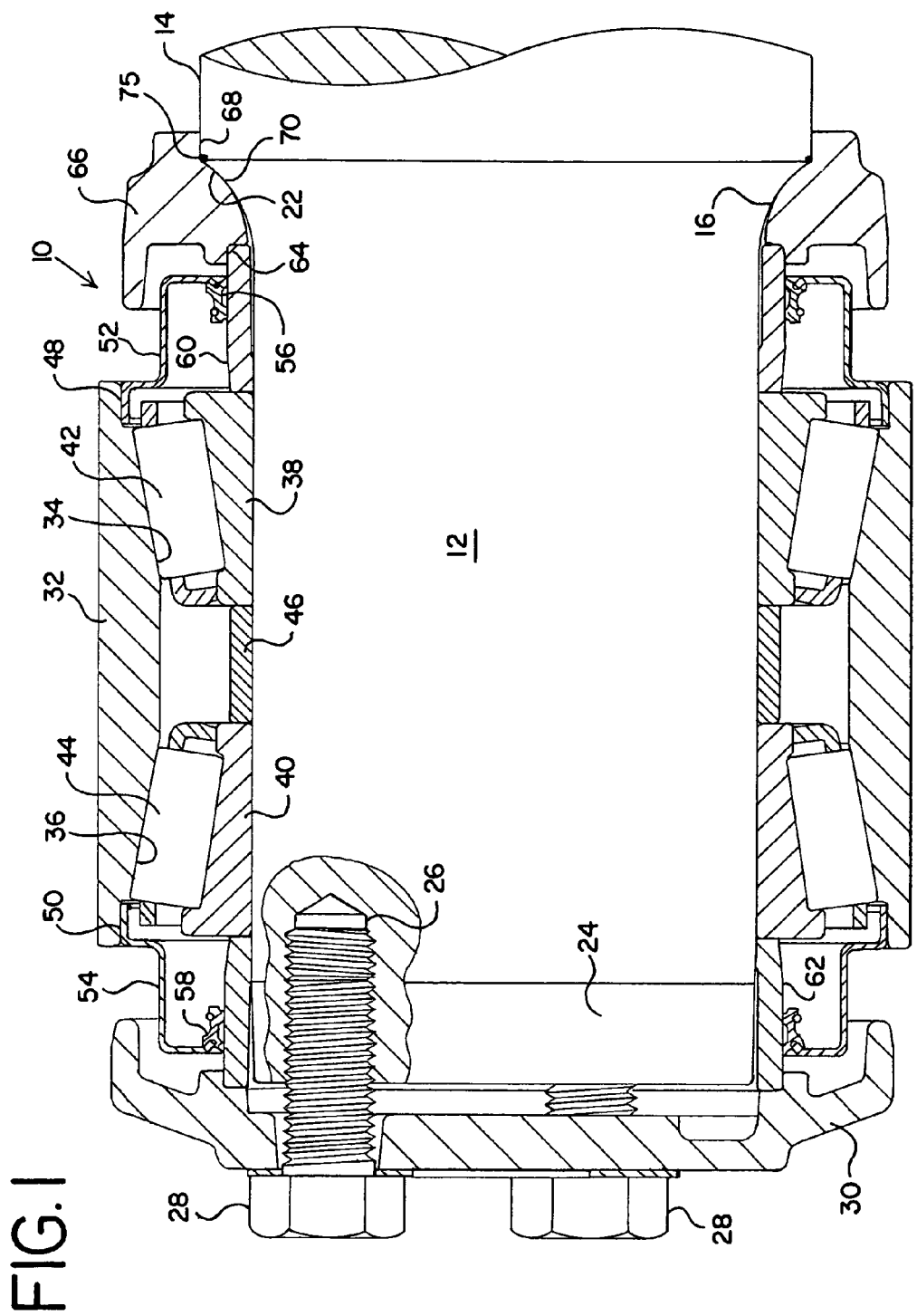
FIG. 1 is a sectional view of a shaft journal having mounted thereon a tapered roller bearing assembly in accordance with the present invention.

Referring now to FIG. 1 of the drawings, a bearing assembly indicated generally by the reference numeral 10 on FIG. 1 is shown mounted on a journal 12 on the free, cantilevered end of a shaft or axle 14, typically a rail car axle. Journal 12 is machined to very close tolerances and terminates at its inner end in a contoured fillet 22 leading to a cylindrical shoulder 18 of axle 14. At the free end of the axle, journal portion 12 terminates in a slightly conical or tapered guide portion 24 dimensioned to facilitate installation of the bearing assembly onto the journal. A plurality of threaded bores 26 are formed in the end of axle 14 for receiving threaded cap screws, or bolts 28 for mounting a bearing retaining cap 30 on the end of the shaft to clamp the bearing in position as described more fully herein below.

The bearing assembly 10 is preassembled before being mounted and clamped on journal 12 by cap 30. The bearing assembly includes a unitary bearing cup or outer raceway 32 having a pair of raceways 34, 36 formed one adjacent each end thereof which cooperate with a pair of bearing cones 38, 40, respectively, to support the two rows of tapered rollers 42, 44, respectively, therebetween. A center spacer 46 is positioned between cones 38, 40 to maintain the cones in accurately spaced relation relative to one another.

The bearing cup 32 is provided with cylindrical counterbores 48, 50 at its opposite ends outboard of the raceways 34, 36, and a pair of seal assemblies 52, 54 are pressed one into each of the cylindrical counterbores 48, 50. The seals 52, 54 include resilient sealing elements 56, 58, respectively, which rub upon and form a seal with a pair of seal wear ring sleeves 60, 62, respectively, having their inwardly directed ends in engagement with the outwardly directed ends of bearing cones 38, 40, respectively. The other end of wear ring sleeve 60 is received in a cylindrical counterbore 64 in the axially outwardly directed end of an annular backing ring 66 which, in turn, has a counterbore 68 at its other end which is dimensioned to be received in interference and non-interference relation on the cylindrical shoulder 18 of shaft 14. The counterbore 64 and the outer diameter of wear ring sleeve 60 are also dimensioned to provide an interference fit so that the wear ring is pressed into the backing ring 66 which is accurately machined to provide a contoured inner surface 70 complementary to and engaging the contour of fillet 116 when the bearing is mounted on the shaft. The outwardly directed end of sleeve 62 bears against the retaining cap 30.

Sealant bead 75 is seen to be located between backing ring 66 and the shoulder portion of fillet 22. Sealant bead 75 is most frequently a silicone sealant such as Dow Corning 737. Sealant bead 75 can be formed by applying a sealant coating to the intersection of fillet 22 and counterbore 168 and then upon press fitting backing ring 66, a seal is formed. Sealant bead 75 forms a seal to water and abrasives that may enter sealed bearing 10 along the outer edge of axle 14.

Figure 2:
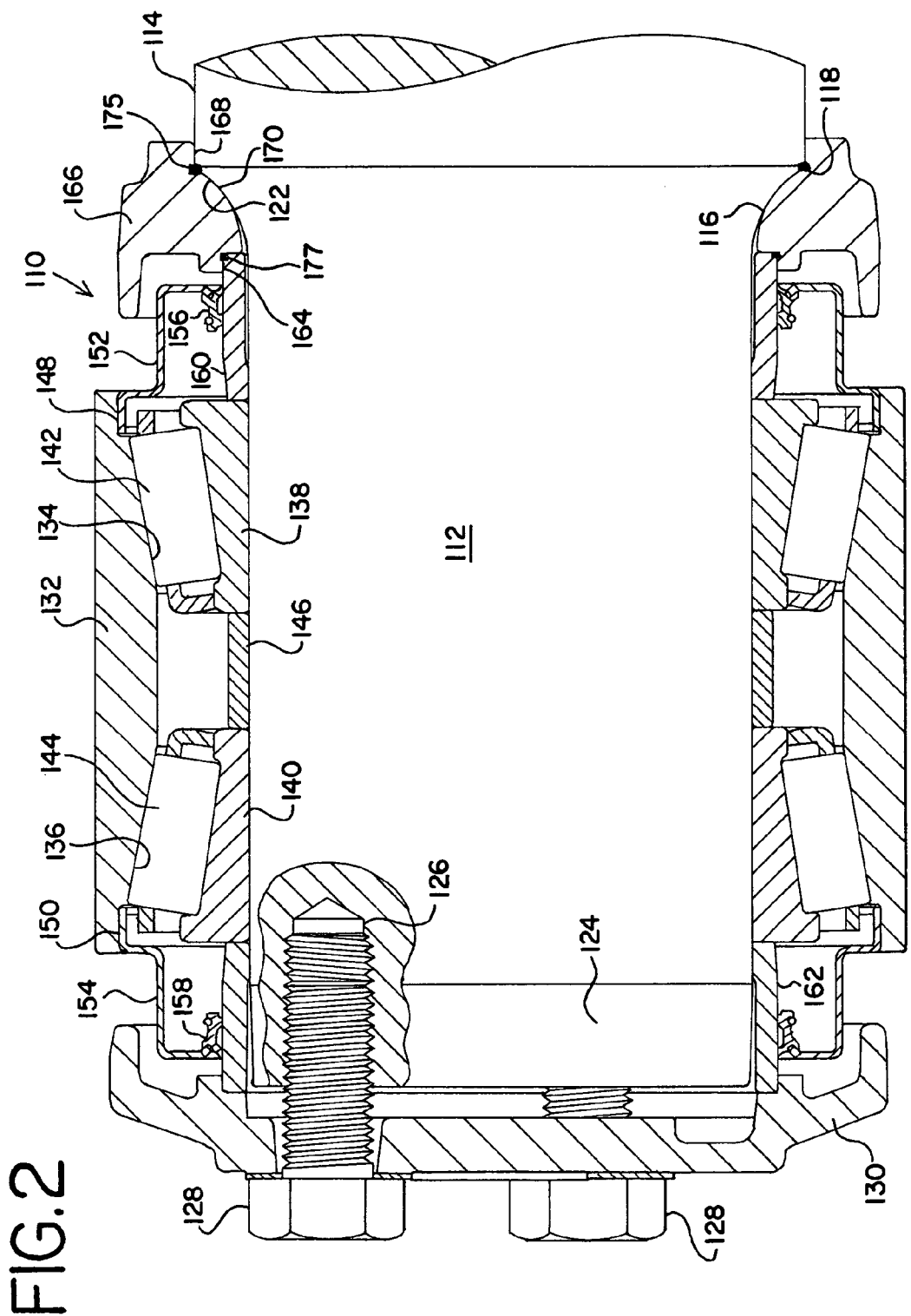
FIG. 2 is a sectional view of a shaft journal having mounted thereon a tapered roller bearing assembly in accordance with a second embodiment of the present invention.

Referring now to FIG. 2 of the drawings, a bearing assembly indicated generally by the reference numeral 110 in FIG. 2 is shown mounted on a journal 112 on the free, cantilevered end of a shaft or axle 114, typically a rail car axle. Journal 112 is machined to very close tolerances and terminates at its inner end in a contoured fillet 122 leading to a cylindrical shoulder of axle 114. At the free end of the axle, journal portion 112 terminates in a slightly conical or tapered guide portion 124 dimensioned to facilitate installation of the bearing assembly onto the journal. A plurality of threaded bores 126 are formed in the end of axle 112 for receiving threaded cap screws, or bolts 128 for mounting a bearing retaining cap 130 on the end of the shaft to clamp the bearing in position as described more fully herein below.

The bearing assembly 110 is preassembled before being mounted and clamped on journal 112 by cap 130. The bearing assembly includes a unitary bearing cup or outer raceway 132 having a pair of raceways 134, 136, formed one adjacent each end thereof which cooperate with a pair of bearing cones 138, 140, respectively, to support the two rows of tapered rollers 142, 144, respectively, therebetween. A center spacer 146 is positioned between cones 138, 140 to maintain the cones in accurately spaced relation relative to one another.

The bearing cup 132 is provided with cylindrical counterbores 148, 150 at its opposite ends outboard of the raceways 134, 136, and a pair of seal assemblies 152, 154 are pressed into each of the cylindrical counterbores 148, 150. The seals 152, 154 include resilient sealing elements 156, 158, respectively, which rub upon and form a seal with a pair of seal wear ring sleeves 160, 162, respectively, having their inwardly directed ends in engagement with the outwardly directed ends of bearing cones 138, 140, respectively. The directed end of an annular backing ring 166 which, in turn, has a counterbore 168 at its other end which is dimensioned to be received in an interference or non-interference relation on the cylindrical shoulder 118 of shaft 114. The counterbore 164 and the outer diameter of wear ring sleeve 160 are also dimensioned to provide an interference fit so that the wear ring is pressed into the backing ring 166 which is accurately machined to provide a contoured inner surface 170 complementary to and engaging the contour of fillet 116 when the bearing is mounted on the shaft. The outwardly directed end of sleeve 162 bears against the retaining cap 30.

First sealant ring or gasket 175 is seen to be located between backing ring 166 and the shoulder portion of fillet 122. Second sealant ring or gasket 177 is seen to be located between such corner of wear ring 160 and shoulder 164 of backing ring 166.

First sealant ring 175 and second sealant ring 177 are usually comprised of a nitrile rubber or another suitable rubber or a synthetic. Sealant rings 175 and 177 form a seal to water and abrasives that may enter sealed bearing 110 along the outer edge of axle 114.

What is claimed is:

1. An assembly comprising a shaft having a shoulder spaced from a free end, a journal of smaller diameter than the shaft between the shoulder and the free end, and a contoured fillet leading from the journal to the shoulder, a bearing assembly adapted to be fitted onto the journal and into another structure to permit relative rotation between the shaft and the other structure, the bearing assembly comprising, a roller bearing including an inner race fitted around the journal and having an outwardly directed raceway thereon, an outer race having an inwardly directed raceway thereon, and roller elements located between and contacting the inner and outer raceways, a backing ring having a contoured surface, complementary to and engaging said contoured surface of the fillet, the contoured surfaces cooperating to fix the backing ring against radial and axial movement on the shaft when the bearing is installed thereon, an annular wear ring interposed between and engaging the inner race and the backing ring, the wear ring having a first end bearing against the inner race and a second end received in interference relation to radially and axially fix the second end on the journal, a first sealant ring interposed between and engaging the shaft shoulder and the backing ring, and a second sealant ring interposed between and engaging the wear ring and the backing ring.

2. The assembly of claim 1 further comprising a shoulder formed in the backing ring, and the second sealant ring interposed between and engaging a corner of the wear ring and the shoulder in the backing ring.

3. The assembly of claim 1 wherein both sealant rings are comprised of a nitrile rubber.

4. An assembly comprising a shaft having a shoulder spaced from a free end and a journal of smaller diameter extending from the shoulder to the free end, a bearing assembly adapted to be fitted on the journal and retained thereon by an end cap mounted on the shaft free end to permit relative rotation between the shaft and an element supported by the bearing, the bearing assembly comprising:

an inboard bearing cone and an outboard bearing cone mounted on said journal, each said bearing cone defining an outwardly directed raceway and each having an inner diameter providing an interference fit on the journal, a bearing cup defining a pair of inwardly directed tapered outer raceways located one in radially outwardly spaced relation to each of the inner raceways, and rolling elements located between the inner and outer raceways, a backing ring adapted to be mounted on the journal and engage the shoulder in a manner radially and axially fix the backing ring on the shaft, the backing ring having an outwardly directed counterbore formed therein defining an axial shoulder, a first seal wear ring having a first end portion received in interference relation within said counterbore and abutting the axial shoulder and a second end portion abutting said inboard bearing cup, the first seal wear ring having its inner surface radially spaced from the journal along the full length of the seal wear ring, and a second seal wear ring mounted in contact with the outboard bearing cone and the end cap, a first sealant ring interposed between and engaging the shaft shoulder and the backing ring, and a second sealant ring interposed between and engaging the wear ring and the backing ring.

5. The assembly of claim 4 further comprising a shoulder formed in the backing ring, and the second sealant ring interposed between and engaging a corner of the wear ring and the shoulder in the backing ring.

6. The assembly of claim 4 wherein both sealant rings are comprised of a nitrile rubber.

\* \* \* \* \*